US008961726B2

(12) United States Patent
Havar et al.

(10) Patent No.: US 8,961,726 B2
(45) Date of Patent: Feb. 24, 2015

(54) METHOD FOR INFILTRATING SILICONE INTO A FIBER COMPOSITE STRUCTURE AND DEVICE FOR EXECUTING A METHOD FOR PRODUCING A FIBER COMPOSITE WORKPIECE

(71) Applicant: Airbus Operations GmbH, Hamburg (DE)

(72) Inventors: Tamas Havar, Bruckmühl (DE); Oliver Meyer, Ottobrunn (DE); York Caesar Roth, Stade (DE); Oliver Seack, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/737,643

(22) Filed: Jan. 9, 2013

(65) Prior Publication Data
US 2013/0200652 A1 Aug. 8, 2013

Related U.S. Application Data

(63) Continuation of application No. PCT/EP2011/003455, filed on Jul. 11, 2011.

(60) Provisional application No. 61/362,953, filed on Jul. 9, 2010.

(30) Foreign Application Priority Data

Jul. 9, 2010 (DE) .......................... 10 2010 026 620

(51) Int. Cl.
*B29C 70/48* (2006.01)
*B64C 3/46* (2006.01)
(Continued)

(52) U.S. Cl.
CPC ............ *B29C 70/682* (2013.01); *B29C 70/443* (2013.01); *B29C 70/48* (2013.01);
(Continued)

(58) Field of Classification Search
CPC ...... B29C 70/36; B29C 70/443; B29C 70/48; B29C 70/682; B29C 70/685; B29C 3/46; B29K 2083/05; B29K 2703/00; B29L 2022/027; B29L 2031/3085; B64C 3/46; B60R 21/231
USPC ...................... 156/245, 285, 329; 244/123.11
See application file for complete search history.

(56) References Cited

U.S. PATENT DOCUMENTS 3,114,598 A 12/1963 Beckadolph et al.
4,029,836 A 6/1977 Wieczorek
(Continued)

FOREIGN PATENT DOCUMENTS

AU 419571 12/1971
CA 2202653 * 2/1997
(Continued)

OTHER PUBLICATIONS

International Search Report for Application No. PCT/EP2011/003455 dated Jan. 23, 2012.
(Continued)

*Primary Examiner* — Michael Tolin
(74) *Attorney, Agent, or Firm* — Jenkins, Wilson, Taylor & Hunt, P.A.

(57) ABSTRACT

The invention relates to a method for producing a fiber composite workpiece. In the method according to the invention, cross-linking silicone is used with the aid of a volatile diluent for infiltrating individual mats of a mat composite. A further object of the present invention is a device for performing the method according to the invention.

10 Claims, 8 Drawing Sheets

(51) Int. Cl.

| | | |
|---|---|---|
| *B29C 70/68* | (2006.01) | |
| *B29C 70/44* | (2006.01) | |
| *B29B 11/16* | (2006.01) | |
| *B29C 70/20* | (2006.01) | |
| *B29C 70/36* | (2006.01) | |
| *B29C 70/46* | (2006.01) | |
| *B29C 70/86* | (2006.01) | |
| *B60R 21/00* | (2006.01) | |
| *B64C 9/38* | (2006.01) | |
| *B29K 703/00* | (2006.01) | |
| *B29B 11/12* | (2006.01) | |
| *B29K 83/00* | (2006.01) | |
| *B29K 105/24* | (2006.01) | |
| *B29L 31/30* | (2006.01) | |

(52) U.S. Cl.
CPC .............. *B29B 11/16* (2013.01); *B29C 70/20* (2013.01); *B29C 70/36* (2013.01); *B29C 70/46* (2013.01); *B29C 70/865* (2013.01); *B60R 21/00* (2013.01); *B64C 9/38* (2013.01); *B29K 2703/00* (2013.01); *B29B 11/12* (2013.01); *B29K 2083/005* (2013.01); *B29K 2105/24* (2013.01); *B29L 2031/3055* (2013.01); *B29L 2031/3085* (2013.01)
USPC ....... 156/245; 156/285; 156/329; 244/123.11

(56) References Cited

U.S. PATENT DOCUMENTS

| | | | | |
|---|---|---|---|---|
| 5,080,851 | A | * | 1/1992 | Flonc et al. ................. 264/258 |
| 5,725,709 | A | * | 3/1998 | Jensen .......................... 156/169 |
| 5,972,512 | A | * | 10/1999 | Boisvert et al. .............. 428/409 |
| 7,195,210 | B2 | * | 3/2007 | Hamilton et al. ............. 244/219 |
| 2008/0251647 | A1 | * | 10/2008 | Lorkowski et al. ........... 244/204 |
| 2009/0224108 | A1 | * | 9/2009 | Lutke et al. ................... 244/219 |
| 2009/0269557 | A1 | * | 10/2009 | Stiesdal ..................... 428/195.1 |
| 2013/0130583 | A1 | * | 5/2013 | Bjornhov et al. ............. 442/218 |

FOREIGN PATENT DOCUMENTS

| | | |
|---|---|---|
| DE | 103 40 561 | 12/1971 |
| DE | 10 2006 023 847 | 11/2007 |
| EP | 0 272 635 | 6/1988 |
| EP | 0 438 033 | 7/1991 |
| EP | 1857267 | 11/2007 |
| FR | 2 924 049 | 5/2009 |
| GB | 2 250 228 | 6/1992 |
| WO | WO 97/07164 A1 * | 2/1997 |
| WO | WO 2012/004003 | 11/2007 |
| WO | WO 2008/013611 A1 * | 1/2008 |

OTHER PUBLICATIONS

German Office Action for Application No. 10 2010 026 620.5-16 dated Jan. 14, 2011.

* cited by examiner

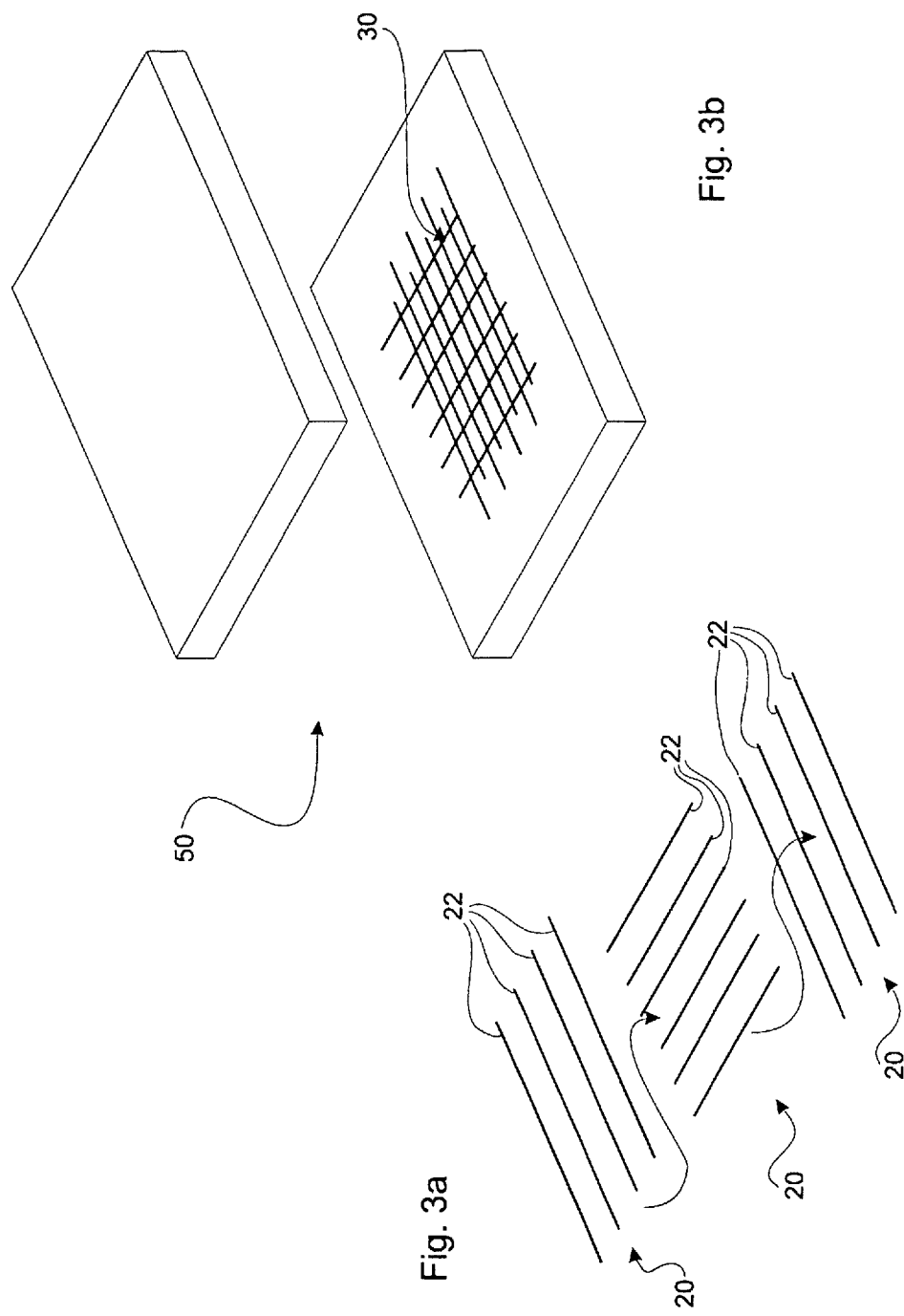

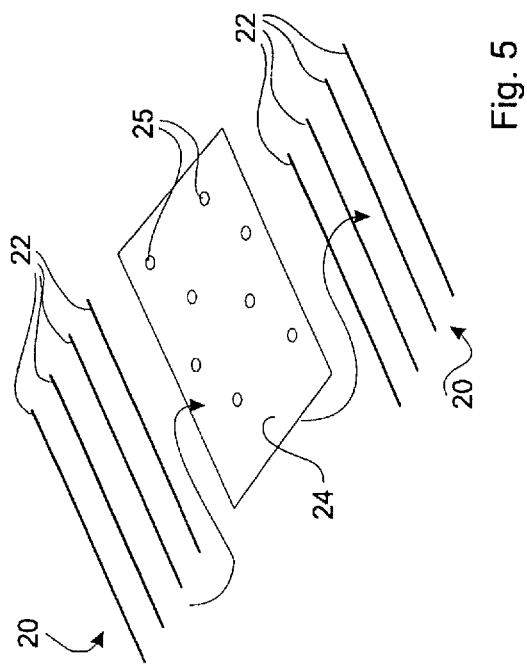
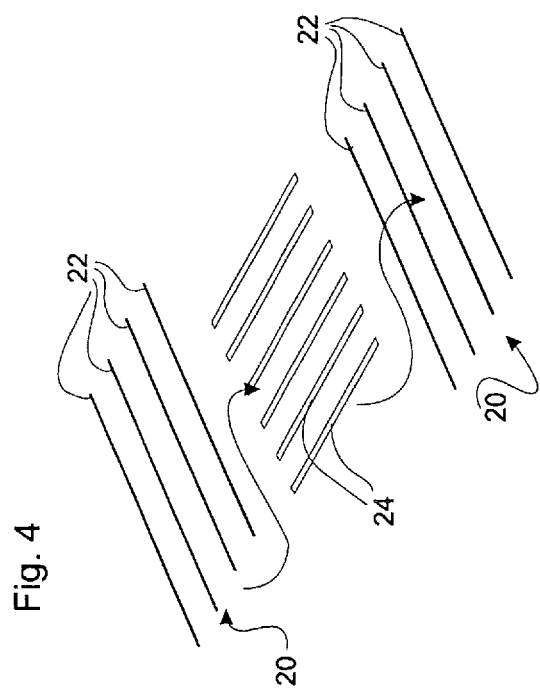

METHOD FOR INFILTRATING SILICONE INTO A FIBER COMPOSITE STRUCTURE AND DEVICE FOR EXECUTING A METHOD FOR PRODUCING A FIBER COMPOSITE WORKPIECE

CROSS-REFERENCE TO RELATED APPLICATIONS

This application is a continuation of and claims priority to PCT application No. PCT/EP2011/003455 filed Jul. 11, 2011, which claims the benefit of the filing date of German Patent Application No. 10 2010 026 620.5 filed Jul. 9, 2010, and of U.S. Provisional Patent Application No. 61/362,953 filed Jul. 9, 2010, the disclosures of which applications are hereby incorporated herein by reference.

TECHNICAL FIELD

The invention relates to a method for producing a fiber composite workpiece and a device for executing a method for producing a fiber composite workpiece.

BACKGROUND

Methods for producing fiber composite workpieces are already known. Such methods are typically such that a combination is produced from fibers and a matrix structure. The fibers are typically made of glass or plastic materials, so-called glass fibers, or carbon fibers. In accordance with the fiber base material, the fiber composite material is frequently referred to as glass-fiber-reinforced plastic or carbon-fiber-reinforced plastic, or GRP or CRP. The matrix of the known fiber composite materials is produced in the known methods in that free-flowing resins or free-flowing thermoplastics are introduced into a fiber structure and cure therein. The result is a multicomponent fiber composite workpiece, i.e., which is equipped with a matrix, through which the respective fibers run. In this way, very light components having very high mechanical stability may be manufactured, which are used in aircraft construction, for example.

SUMMARY

The object of the present invention is to provide a method and an associated device, using which fiber composite workpieces having high mechanical stability and simultaneously high flexibility can be produced, and which allows a wide variety of use.

The preceding object is achieved by the subject matter of the independent claims. Advantageous embodiments result from the respective sub claims following the independent claims.

The material according to the invention has the advantage that it has a high or even very high flexibility an additionally a very high mechanical stability. As the flexibility is sufficiently high, in the event of stronger bending or stretching of the material, cracks will not be generated in the material and it is avoided that the matrix would detach from the fiber so that the mechanical stability of the workpiece is maintained. For fields of use in which a high flexibility or at least a certain degree of flexibility is required in addition to a high mechanical stability, the material or fiber composite workpiece according to the invention is usable to a very extended extent and with relatively little design effort. Usage areas having such requirements are, for example, flexible rear edges of control flaps, which are to be provided with a flexible skin, and which are to be movable back-and-forth like a diaphragm between a first folded-in position and a second folded-out position, i.e., a folded-in dimensional state and a folded-out dimensional state. A high flexibility is required for this purpose, a high mechanical stability and additionally the lowest possible structural weight fundamentally being required. These requirements can be fulfilled by the material according to the invention are not producible using the known methods for producing fiber composite workpieces.

In the method according to the invention, cross-linking silicone is used, with the aid of a volatile diluent, for infiltrating individual mats of a mat composite.

A method according to the invention for producing a fiber composite workpiece has the following steps:
situating at least two mats made of fibers one over another
bonding the at least two mats to one another to form a porous mat composite
producing a mixture made of liquid, cross-linking silicone with at least one volatile diluent, which has a lower viscosity than the silicone alone
laying and submerging at least one mat composite in the mixture, and
curing by cross-linking the silicone and evaporating the diluent A method according to the invention allows for the first time the production of a mechanically stable and simultaneously a highly flexible fiber composite workpiece with a high fatigue resistence. In order to produce the matrix of the fiber composite, a liquid, cross-linking silicone is used. On the one hand, the silicone provides sufficient structural strength to the entire fiber composite workpiece in its function as the matrix structure, which receives its mechanical stability via the orientation and material selection of the respective fibers, while the silicone itself introduces the property of flexibility into the material. It has surprisingly been found that silicone, which is typically used in similar methods as a separating agent, i.e., as a material which is to prevent a bond between fiber composite workpiece and a tool device, can function here in the opposing sense as a matrix, i.e., as a bonding material. Furthermore, it has surprisingly been found that the silicone alone can only penetrate into a complex structure of a mat composite under difficult conditions. The penetration of the silicone into the structure of the mat composite is primarily driven via the capillary forces within the mat structure. The penetration speed or the penetration depth is at least partially related to the viscosity of the material which is to penetrate, i.e., the silicone mixture, as well as the surface tension and its contact angle with the surface of the fibers.

The penetration into the structure of the mat composite is made easier in particular if a lower viscosity is provided in comparison to a higher viscosity of the silicone alone. The penetration or also the procedure referred to as infiltration of the mat composite is made easier by the provision according to the invention of a volatile diluent. Only the combination of a diluent, which is additionally volatile, with a liquid, cross-linking silicone allows a fiber composite workpiece according to the invention to be achieved in this way, which has a high mechanical stability with high flexibility at the same time.

Specifically, an additively cross-linking silicone, which thus comprises multiple components, is frequently used. To produce the mixture, in a first step the respective components of the additively cross-linking silicone are mixed with one another, so that, for example, a mixture made of 85% of a first component and 15% of a second component of an additively cross-linking silicone is mixed together. All components may be silicones themselves, or also materials which support the cross-linking. From this mixing time of the individual components, the so-called "working life" starts, within which the silicone remains processable. In other words, this working life corresponds to the maximum processing time, within which the cross-linking of the silicone has not yet progressed so much that it would oppose an infiltration of the silicone mixture into the mat composite. The working life corresponds more or less to the time for curing the silicone, not up to complete cross-linking, but rather only up to a degree which no longer allows processing using infiltration. In this state, the mixture of the multicomponent silicone, in particular an additively cross-linking silicone, is still distinguished by relatively high viscosity in spite of its liquid aggregate state, however. Because of this high viscosity, the silicone will infiltrate a complex structure of a mat composite, but this infiltration will only run with a low degree of penetration through the mat composite. Therefore, areas remain in the mat composite in which a matrix of the silicone forms only incompletely or not at all. In other words, areas remain in which the fibers are not enclosed by a matrix and correspondingly the individual fibers are not fixed to one another by a matrix. However, without a completely formed matrix, neither the flexibility nor the mechanical stability is achieved to a sufficient extent at such locations. Therefore, in the event of inadequate infiltration of the matrix material, flaws remain in the material, which could result in the worst case in the failure of a component manufactured therefrom.

Therefore, the degree of infiltration is to be increased according to the invention. This is achieved in that a volatile diluent is admixed to the silicone, so that the entire mixture represents a mixture made of the components of the additively cross-linking silicone, on the one hand, as well as the diluent, on the other hand. The viscosity of the mixture is lower than the viscosity of the silicone or the silicone composition alone. In other words, the diluent reduces the viscosity of the mixture, so that in this way one of the main mechanisms of penetration of the mat composite, namely the infiltration by capillary force, is made easier. In addition, the ability to wet the individual fibers is also improved by a reduction of the viscosity. In summary, it was surprisingly found that, through the reduction of the viscosity using a diluent, the infiltration of the silicone during the working life is made significantly easier and thus improved and/or accelerated. Due to the higher degree of penetration because of the improved infiltration, fewer flaws are produced in the material and therefore a more mechanically stable component, which is less susceptible to flaws, is produced from fiber composite. An improved fiber composite workpiece thus results.

Up to this point, the usage of such diluents was only conceivable under difficult usage conditions or not at all, since the diluent itself has an interfering effect in the implemented matrix structure of a fiber composite workpiece. This diluent would thus remain there and gradually evaporate during the usage of the component, e.g., run out over a long period of time. Such running out would be correlated with later contraction of the fiber composite workpiece, i.e., shrinking of the component. It is also disadvantageous for liquid diluent to remain within the fiber composite workpiece, since in the event of large temperature variations, the aggregate state of the diluent can change and material tensions or cracks can be generated in the fiber composite workpiece by different volume expansions. Therefore, a volatile diluent was used according to the invention as the diluent, and an evaporation step of the diluent is performed in the method according to the invention before, after, or during the curing by cross-linking the silicone. This evaporation step can be executed differently depending on the type of the diluent. E.g., it is possible that it is sufficient in the case of rapidly volatile diluents to wait for a defined time span of a few hours or up to a few days, after which the majority of the liquid diluent has evaporated. This can be performed at room temperature, i.e., at 20° C., for example. Higher temperatures, for example, 25° C., 30° C., 35° C., 40° C., 45° C., 50° C., 55° C., 60° C., 65° C., 70° C. or more are also conceivable depending on the type of the liquid diluent. However, it is particularly to be ensured that, upon the selection of the temperature for the evaporation of the liquid diluent, it is not above or close to the flashpoint of the liquid diluent. In this way, the danger of explosion or fire during the performance of the method according to the invention is reduced.

A further essential component of the present invention is the step of laying and submerging at least one mat composite in the mixture. Submersion in the context of the present invention is to be understood to mean that the mat composite is located in a position in which it is enclosed by the mixture on all sides. In particular, the mat composite, in relation to a liquid level of the mixture, is located below the surface of the liquid level. The mixture can accordingly penetrate from all sides into the workpiece. The existing infiltration surface area is thus increased. In comparison to situations in which material is only supplied from one side, a surface area available for infiltration is even essentially doubled. It is to be noted that the submersion can be executed as various relative movements. It is thus possible, on the one hand, that, in an existing bath made of a mixture, the mat composite is actively submerged below the liquid level of this mixture. However, it is also conceivable, vice versa, that in the context of the present invention, a mat composite located in a trough or in a tool device is flooded using a mixture, which reaches a level corresponding to the submerged state of the mat composite.

Different speeds can also be advisable for the submersion. It is thus possible that the submersion occurs rapidly, more or less together with the laying of the mat composite in the mixture. However, a time offset or a time delay is also conceivable, so that the submersion of the mat composite occurs over a defined time span. The infiltration procedure already starts at the already immersed sections of the mat composite during the procedure of the submersion. In particular in the case of a relatively thick mat composite, this can be advantageous, since in this way fluids, in particular gases such as air, which are still located in the mat composite can escape via the sections which are not yet immersed. Degassing or deaeration is thus possible during the submersion. In this regard, according to the invention a manufacturing device is provided comprising a holding device for holding a mat composite according to the invention, guiding device with an actuator for adjustment of the attitude and/or position of the holding device with the mat composite relative to the submersion an existing bath made of a mixture of a silicone and a diluent. A control device is coupled to the guiding device which according to preset values generates command signals to the actuator of the guiding device for adjusting the attitude and/or position of the holding device relative to the submersion an existing bath. The control device can comprise an input device which is designed such that preset values in particular corresponding to time limits can be entered into the control device. The control device can further be designed such that on the basis of the preset values in particular corresponding to time limits the time-dependent movement of the holding device by the guiding device for the submersion process according to the invention and as described herein is commanded and realized.

The positioning of at least two mats made of fibers can be performed differently. Thus, individual fibers which are adjacent to one another in the essentially planar orientation and are not bonded to one another, i.e., are also to be understood as mats, and have an extension in the essentially two spatial directions of different fiber directions, which already have a first cross-linking with one another. At least two such mats are laid one on top of another, the orientation of the fibers in the respective mat being able to differ from one another. It is thus possible that the fibers of the respective mats are situated at angles to one another, for example, at 90° angles to one another or at 30° or 60° angles to one another. A porous structure of the mat composite is defined by laying the mats one on top of another. The areas between the individual fibers and within the mats and also between the mats define pores, which are each connected to adjacent pores. In other words, the mat composite can also be referred to as spongy or porous. It is thus absorbent.

It is very advantageous if the mat composite is sufficiently porous that no closed pores are contained therein. This means that no pores are provided which are no longer reachable from outside the mat composite. Rather, it is an open-pored formation, in which essentially every cavity, i.e., every pore of the mat composite, is connected to other pores via a pore network to the outer side of the mat composite. In this way, 100% infiltration with the silicone mixture is at least theoretically conceivable. The pores connected to one another thus form fluid channels or infiltration channels or flow channels for the mixture.

Through the combination according to the invention of silicone for the cross-linking and therefore for matrix formation, on the one hand, and fibers for generating mechanical stability, on the other hand, fiber composite workpieces can be produced which have the known mechanical stability of fiber composite workpieces, but are additionally flexible in a way which is previously unknown in such workpieces. Such fiber composite workpieces can be used in manifold ways. An essential usage point can be usage in the aircraft industry. It is thus possible that aerodynamically active areas of an aircraft, a high lift system, or airfoils or individual flaps are manufactured from such a material. In this way, light workpieces can be produced, which have different aerodynamic properties depending on the flight situation, since different geometric formations can be produced by the flexibility of the respective sections. It is thus possible that, for example, on control flaps, individual sections of these control flaps are equipped with the flexible fiber composite workpiece, and can be moved back-and-forth between various geometries or deformations in this way. Depending on the flight situation, different geometries, bulges, curves, and/or cross-sections of the respective control flap or the respective wing or wing section can be produced.

In this regard, according to an aspect of the invention, a fluiddynamic body and in particular an aerodynamic body which can in particular be a wing or a control flap comprising an adjustment device is provided. The adjustment device is a deformable structural part like a skin, a membrane or a flexible shell part which is connected to the wing or flap such that a deformation of the deformable structural part effects or influences the fluid flow and aerodynamic flow, respectively, on the surface of the fluiddynamic body and the aerodynamic body, respectively, originated by a free flow on the same in operation. The deformable structural part is connected to the fluiddynamic body and the aerodynamic body, respectively, such that portions or edges of the same are connected to the fluiddynamic body and the aerodynamic body, respectively, in a manner that a surface portion of the fluiddynamic body and the aerodynamic body, respectively, is part of the flow surface of the fluiddynamic body and the aerodynamic body, respectively, so that the a surface portion of the fluiddynamic body and the aerodynamic body, respectively, surrounding the deformable structural part together with at least a portion of the surface of the deformable part form a unitary flow surface of the fluiddynamic body and the aerodynamic body, respectively. An actuation device is coupled to the deformable body such that it can actuate the same in a predetermined manner and thereby forms the same in a predetermined manner. Depending on the actuation movement of the actuation device, the deformable body forms different deformable states, by which consequently also the flow surface of the fluiddynamic body and the aerodynamic body, respectively, is modified or deformed. A control device which is coupled to the actuator generates, on the basis of a control function, command signals on the basis of preset values in order to actuate the actuator. The preset values can be values which are determined by another function which demands the influencing of the fluid flow along the surface of the fluiddynamic body and the aerodynamic body, respectively. Alternatively or in addition, the preset values can be generated by an input device which can be operated or commanded by a user. In particular, the input device is a pilot input device like a pilot stick functionally coupled to the control function for steering a flight vehicle or an aircraft by changing the form of the flow surface of the aerodynamic body by deforming the deformable body. In an embodiment of the invention, a wing or flap comprising a deformable body form a form variable wing or flap, respectively. According to an embodiment of the invention, the wing or flap comprising a deformable body has the function to steer the aircraft, i.e. influence or maintain the flight attitude of the aircraft, and/or to adjust the aerodynamic behavior of the same and especially the local lift coefficient of the same and/or to influence vortices which are caused by the wing or flap depending on the flow over the surface of the same. Generally, by deforming the deformable body the aerodynamic flow over the surface of the same and/or vortices being generated by the wing or the flap are influenced or for example to influence flow and vortices.

Furthermore, it is also conceivable that fiber composite workpieces produced according to the invention are used in the safety field. It is thus possible, for example, that a bladder formation or a bellows is produced from such materials, which is extraordinarily light and therefore simple to transport, on the one hand, but has sufficient mechanical stability to lift heavy components or, for example, upon use in fire departments, to lift crashed cars or separate them from one another, on the other hand. Such a bellows or such a bladder formation made of fiber composite material according to the invention does not suffer from the disadvantages of fiber-reinforced fabric heretofore used, which can receive a crack or a hole significantly more easily and thus become unusable as a whole.

According to an aspect of the invention, a shock absorber comprising a bellows or a bladder formation made of a material according to the invention is provided which can in particular be integrated in the front end section of an automobile on order to absorb kinetic energy in the case of a crash or an impact.

It is also conceivable that airbag systems for motor vehicles are implemented using a fiber composite workpiece according to the invention. In particular, external airbags are conceivable, which externally cushion individual sections of a motor vehicle in case of crash with pedestrians or bicyclists, for example, and minimize the risks of injury in this way. It is thus possible, for example, that such an external airbag is situated in areas or sections of the engine hood which are extraordinarily light due to the use of a fiber composite workpiece according to the invention produced by a method according to the invention. These external airbags are inflated in case of crash and prevent injuries which a bicyclist or pedestrian would receive if he hit the hard engine hood.

Furthermore, it is possible that in case of crash, a bellows or airbag system made of fiber composite workpieces produced according to the invention is situated below the engine hood or below other movable parts of a motor vehicle an in particular between an carriage or car body and the engine hood or another movable part of the motor vehicle, which are moved into a crash position in case of crash. Through the explosive inflation of such external airbags, for example, the engine hood can be raised and therefore a reduction of injury in case of crash for pedestrians or bicyclists, and/or an improved crash geometry of the motor vehicle can also be achieved.

Furthermore, it is possible that for the first time, through the use of a fiber composite workpiece produced according to the invention, classical fiber composite workpieces, i.e., fiber composite workpieces having thermoplastic or resinous matrix materials, can be used in motor vehicles. Such a use was heretofore only conceivable under difficult requirements, since in case of crash the known fiber composite workpieces tended to splinter and the individual fibers appeared. These protruding fibers in the fiber composite workpiece according to known methods therefore represent a high risk of injury, since they can protrude with sharp edges, e.g., into the interior or out of a vehicle. If a fiber composite workpiece produced according to the invention is used, having the combination of high mechanical stability and high flexibility, it can be used for the purpose of shielding the fiber composite workpieces of the classical type produced in a known way. In other words, a fiber composite according to the invention is applied to a known fiber composite, so that the flexibility of the fiber composite workpiece according to the invention lies like a skin over the protruding fibers of the known fiber composite workpieces in case of crash and shields them and therefore reduces the risk of injury more or less to zero. For example, a sandwich structure is conceivable in this way, which is terminated, i.e., secured, on both sides using a fiber composite workpiece.

In the context of the present invention, the introduction of the mixture into the mat composite, i.e., the following infiltration, can also be accelerated by partial vacuum. The term "partial vacuum" is explicitly not to be understood as a vacuum. Rather, the partial vacuum is to be selected cautiously and it is not to be selected as excessively large, since otherwise the diluent would already evaporate to a large extent during the infiltration. In this case, the diluent would possibly not be present during the infiltration to the compensating extent, which could result in inadequate degrees of penetration and the disadvantage described in the introduction of this application. This partial vacuum is used exclusively for the purpose of increasing the force with which the infiltration into the mat composite is driven. In addition to actively acting mechanisms, for example, the capillary force or gravity, the speed of the infiltration can be increased via the application of a partial vacuum. This can be advisable in particular if the working life of the employed mixture, in particular an additively cross-linking silicone, would be less than the actually required infiltration time. The application of a partial vacuum therefore also allows the use of mixtures which have a very short working life. Working lives in the range of at least 5 minutes and up to half an hour are conceivable. However, it is to be noted that the working life exclusively represents the processing time and not the termination of the cross-linking. Fiber composite workpieces produced according to the invention are therefore advantageously not yet strained over a certain period of time after performing the method, but rather cured further. A degree of cross-linking which includes 80, 85, or even 90% of the silicone is the target in particular. I.e., this means that 80, 85, or 90% of the cross-linking bridges to be achieved in the additively cross-linking silicone are already formed and only the remaining 20, 15, or 10%, respectively, are still to be cross linked. The cross-linking itself runs asymptotically toward the 100% cross-linking situation. Therefore, waiting for 100% cross-linking is not cost-effective and is replaced by the point of 80%, 85%, or 90% cross-linking.

The mat composite is produced by positioning at least two mats made of fibers one on top of another. The pores, i.e., the type and the shape of the porosity of the mat composite, are produced in particular by the positioning and above all the bonding of the individual mats. The form of the porosity is also to be understood as a flow pathway or as manifold flow pathways with respect to the infiltration using the mixture. With respect to capillary effects, the individual flow pathways are also capillaries, narrow tubes, or flow channels, through which the mixture is infiltrated. With respect to a desired increase of the penetration using mixtures or to a reduction of the time for the infiltration, it can be advantageous if the mats made of fibers are situated one on top of another and/or the bonding procedure is performed such that short flow pathways result in the mat composite. This is advisable in particular if a silicone is used which has a relatively short working life.

A fiber composite workpiece which is both highly mechanically stable and also simultaneously relatively flexible can be produced in a method according to the invention. Silicone whose yield point alone is approximately 700% is used for this purpose. By this high yield point of the matrix material, i.e., of the silicone in the cross-linked state, the high flexibility of the fiber composite workpiece is thus produced to a large extent. Depending on the usage situation, the silicone is to have a relatively high temperature resistance of up to 100° C., up to 150° C., or in special cases even up to 200° C. This temperature resistance is required, for example, in the case of usage for airfoils in aircraft construction, since extreme temperature ranges of down to minus 50° C. and on the positive side to over 100° C. may occur during the use in an aircraft.

In addition to the temperature resistance, aging resistance is also advantageous. This means that if silicones are used, the flexibility is not generated by additives, such as softeners, but rather originates from the matrix of the cross-linked silicone itself. Because additives such as softeners are not included, it is also not possible for these additives to diffuse out and therefore an aging process and becoming brittle, as is known from other plastic materials, are not possible. A fiber composite workpiece produced according to the invention is therefore essentially aging-resistant with respect to the flexibility. A mixture of according to the invention can have an additively cross-linking silicone having a viscosity of approximately 5000 mPa/s in a first step, for example. The goal is to reduce this viscosity using a corresponding volatile diluent such that infiltration is possible to the desired extent with respect to degree of penetration and penetration speed. It is advantageous if the diluent produces a mixture whose viscosity is approximately one-tenth of the viscosity of the silicone alone. Still lower viscosities of the mixture in comparison to the viscosity of the silicone alone are also advantageous. At a silicone viscosity of 5000 mPa/s, for example, 200-500 mPa/s is to be selected as the viscosity for the mixture as the goal of the dilution.

Furthermore, it is to be noted that it is advantageous if all materials which are used in a method according to the invention are so-called "poison-free". This "poisoning" relates to the cross-linking of the silicone, i.e., to materials which counteract or even prevent the cross-linking. These are typically heavy metals or sulfur, for example. A method according to the invention, in particular also devices for executing this method, accordingly has the least possible proportions of such poisons or freedom from such poisons.

For example, petroleum or petroleum spirit can be used as the volatile diluent. It has relatively little reactivity or is nonreactive with silicone components and has a low viscosity which can achieve the desired dilution of the mixture. In addition, petroleum or petroleum spirit has no poisons, which would counteract the cross-linking of the additively cross-linking silicone.

A method according to the invention can be refined in that the bonding of the mats made of fibers is performed using gluing. In addition to this gluing, other bonding methods, such as compression or formfitting bonding, for example, by diffusion welding, are also conceivable. Alternatively, sewing is also conceivable as a bonding method. Gluing can be performed, for example, using a thermoplastic binder, which is already applied to the fibers when the mats are positioned or is also inserted as a separate mat. Such a thermoplastic binder is heated together with the mats of the fibers during the bonding step, so that the thermoplastic binders are plastically deformable. Through compression of the individual mats with one another and subsequent cooling, the thermoplastic binders will bond the individual mats to one another. However, this thermoplastic binder is not a matrix which completely encloses the fibers, but rather is exclusively a bond between the individual mats to produce a mat composite. The required strength for the mat composite is multiple times less than the mechanical stability which the fiber composite material receives through the method according to the invention itself.

A method according to the invention can be improved in that, during the positioning of the mats made of fibers, at least one stiffening mat made of already cured fiber composite material is inserted between the individual mats. In other words, according to a method according to the invention, a combination of a fiber composite material according to the invention with already known fiber composite materials can be achieved. Through the use of known fiber composite materials, the mechanical stability of the fiber composite material to be produced can be amplified still further, but this is performed by reducing the flexibility of the fiber composite material. Depending on the type and location, but particularly depending on the shape of the employed stiffening mats, however, the chemical stability is not fundamentally increased, but rather only in individual orientations, namely the orientation of the inserted stiffening mats. Flexibility can remain uninfluenced in certain areas or in certain directions, while the mechanical stability is significantly increased in other orientations thereto. In this way, lamellar structures can thus be defined, which, similar to roller blinds, have practically no influence on the flexibility in one direction and produce a complete flexibility reduction in a direction perpendicular thereto.

For cases in which the stiffening mats are provided over the entire area between the individual mats of the mat composite, the danger exists that the flow pathways, i.e., the flow channels for the infiltration of the mixture, will be closed. In order to prevent this, it can be advantageous if openings, i.e., holes are provided in the stiffening mat to a sufficient extent, which reconnect the flow channels to one another and produce the open porosity of the mat composite again. It is thus ensured that a high degree of infiltration or a high degree of penetration is also not prevented by the use of a stiffening mat.

If stiffening mats are used, it can be advantageous if they are inserted adjacent to one another and/or one on top of another along at least one common orientation. Accordingly, stiffening mats can be inserted not only between two mats, but rather also between different mats. Sandwich systems can thus be achieved, one stiffening mat or also multiple stiffening mats being provided between each two mats of a plurality of mats. The alignment or orientation of these stiffening mats relates to both the geometric orientation of the shape and also to the orientation of individual fibers within these stiffening mats. If known fiber composite structures are used for stiffening mats, these orientations of the fibers within the material thereof can have a main direction. It can be advantageous to insert such stiffening elements having identical orientation of the fiber directions of the stiffening mats in all of their usage positions in the mat composite. It is also conceivable that the orientation of the reinforcement mats per se, i.e., with respect to their shape, has the same orientation. This is advantageous in particular if reinforcement mats having lamellae are used, since in this way the above-described roller blind effect, i.e., the stiffening exclusively in one direction and the substantial free flexibility in the direction perpendicular thereto, is maintained.

In order to increase the functionality of a fiber composite workpiece produced according to the invention still further, it can be advantageous if the stiffening mats have reversibly closed cavities, in particular cavity channels, which are inserted such that these cavities are opened after ending the immersion procedure. These reversibly closed cavities particularly do not form pores which are capable of infiltration with the mixture. In other words, these cavities are closed during the immersion procedure, so that infiltration, i.e., filling of these cavities with matrix material, i.e., the mixture of silicone and diluent, is prevented. After the cross-linking, i.e., the curing of the silicone, these cavities can be opened and are thus accessible for filling by fluids as cavities. For example, if fiber composite workpieces according to the invention are used in aircraft construction or as other flexible elements which are to assume various shape positions or shape states, such cavity channels can be used to generate various shape states. Thus, through the orientation and size and/or shape of these cavities or cavity channels, a structure can be predefined which results upon filling using fluids, i.e., for example, by inflation using compressed air. Stiffening by filling with fluid, for example, compressed air, is also conceivable through such cavity channels.

The use according to the invention of stiffening mats having cavities thus allows a flexibility with respect to the adaptation of the mechanical stability of the fiber composite workpiece. Depending on the usage situation, the mechanical stability can be changed and adapted in one or all directions, depending on the orientation of the stiffening mats, by filling the cavities with fluid, for example, compressed air. The cavities function similarly to the individual air chambers of an air mattress.

A method according to the invention can also be refined in that during the evaporation of the diluent and/or the submersion of the mat composite, a partial vacuum is applied to the mat composite. This partial vacuum essentially has two effects. On the one hand, the application of the partial vacuum has an improving effect on the speed of the infiltration of the mixture into the mat composite. This means that the infiltration is supported and the mixture is more or less suctioned into the mat composite. Simultaneously, excess air is sucked out of an area of the mat composite, so that the danger of air inclusions, i.e., flaws in the fiber composite workpiece, is reduced.

A further advantage of upon use of a partial vacuum is the reduction of the evaporation temperature of the diluent, i.e., without the application of additional temperatures or by applying only slight temperature increases, a greater volume stream of diluent can be evaporated. The speed of the evaporation can thus also be set via a partial vacuum, so that through the combination of temperature regulations and pressure regulation, the speed of the infiltration and the speed of the evaporation can be set. It is thus conceivable, for example, that if a strong partial vacuum is applied, cooling must be performed so that the diluent does not evaporate excessively rapidly. Simultaneously, it is also possible that the diluent will evaporate sufficiently rapidly through the application of a higher temperature in the case of infiltration under ambient pressure. The suitable combination for any usage situation can be selected through the possibility of being able to influence the parameters of pressure and temperature independently of one another.

It can also be advantageous if a petroleum is used as the volatile diluent. "Petroleum" is to be understood as a petroleum or a petroleum spirit. Typically, through the use of petroleum as the volatile diluent, the infiltration as a process is reduced from a duration of up to 3 to 4 hours without diluent to an infiltration within a few minutes. This is primarily achieved in that the viscosity of the mixture having the petroleum is reduced in comparison to the undiluted silicone mixture to less than one-tenth of the original viscosity, e.g., from 5000 mPa/s to 200 to 500 mPa/s.

It can also be advantageous if, in a method according to the invention, the mixture ratio between the liquid, cross-linking silicone and the diluent is 2:1 in the mixture. In particular, the mixture ratio in terms of weight or volume between the liquid, cross-linking silicone and the diluent is 2:1±20% of the total weight and volume, respectively, of the total mixture. This parameter region can advantageously be for important applications 2:1±10% of the total weight and volume, respectively, of the total mixture. The quantities of the silicone are advantageously to be selected so that essentially precisely 100% of the silicone is absorbed. In other words, the excess of the cross-linked silicone is to be reduced to a minimum in this way. Silicone which remains in excess on the workpiece cross-links harmlessly on the surface thereof and falls off over time, so that it does not display any effect. A reduction to a quantity of silicone which essentially corresponds to the quantity to be infiltrated, i.e., the pore volume in the mat composite, reduces the waste quantity, on the one hand, and reduces the material costs during the performance of the method according to the invention, on the other hand, in this way.

Care must be taken in particular in the selection of the quantity of the diluent. In particular if an excessively large quantity of diluent is used, the edge areas may dry out too rapidly during the evaporation, i.e., during the drying of the fiber composite workpiece. The dried-out edge areas of the fiber composite workpiece act as diffusion barriers, which leave the areas of the fiber composite workpiece further inward damp, i.e., still impregnated with volatile diluent. In this way, the evaporation process lasts significantly longer, i.e., the duration of time after which the core area of the fiber composite workpiece is also freed of volatile diluent. This results in later shrinking of the component, which negatively impairs the fitting precision after the installation and is advantageously to be avoided.

It can also be advantageous if, before the mat composite is laid in the mixture, the mat composite is pretreated with a primer, which improves the adhesion of the silicone to the fibers of the mat composite. In other words, such a primer is advantageously an adhesion promoter, i.e., a material which is free-flowing, so that it is suitable for pretreating the mat composite or the mats. The adhesion of the silicone on the fibers occurs in various ways. In addition to only cross-linking around the fibers, i.e., only geometric fixing of the fibers in the matrix, it is possible through the use of a primer, such as an adhesion promoter, that carbon bridges or also hydrogen bridge bonds are formed between the matrix of the silicone and the fibers. These bonds increase the bonding strength between the matrix and the fibers, so that it is less probable that the matrix will withdraw from the fibers. In addition to the mechanical stability, this also substantially improves the aging resistance over a plurality of stressing procedures, i.e., shaping procedures between different flexible shape states. The use of a primer is advantageous in particular if a high fiber volume is used, i.e., the proportion of fibers in the finished fiber composite workpiece is relatively high in relation to the total volume of the fiber composite workpiece.

A further object of the present invention is a device for executing a method for producing a fiber composite material. Such a device can particularly be used for executing a method according to the invention for producing a fiber composite workpiece. Such a device has a first tool device for bonding mats made of fibers to form a mat composite and a second tool device. The second tool device is used for infiltrating a mixture made of liquid, cross-linked silicone with at least one volatile diluent, which has a lower viscosity than the silicone alone, into the mat composite. The second tool device has a lower tool, in which the mixture can be provided and in which the mat composite can be laid and submerged. Through the use of a device according to the invention, the same advantages can be achieved as have already been described for the method according to the invention. Such a device is thus used to produce an advantageous fiber composite workpiece. It is to be noted once again that the laying and submersion of the mat composite in the mixture can occur in both relative directions. It is thus possible that the mixture is already poured into the lower tool of the second tool device before the mat composite is laid in it, and the mat composite is laid in it and submerged below the level of the mixture. However, contrary to this possibility, it is also conceivable that the mat composite is laid in the empty, i.e., dry lower tool, and the mixture is subsequently introduced so that a level above the mat composite results.

A device according to the invention can be refined in that an upper tool is provided for the second tool device and the lower tool and/or the upper tool of the second tool device have supply channels and/or discharge channels for fluids. These supply channels and/or discharge channels have a fluid-communicating connection with the volume between the lower tool and the upper tool of the second tool device. The term "fluid-communicating connection" is to be understood to mean that fluid can be supplied to the volume between the lower tool and the upper tool, or can be discharged from this volume, via these supply channels or discharge channels, respectively. The supply channels or discharge channels are thus used to convey fluids, i.e., in the case of supply, e.g., the supply of the mixture in the liquid aggregate state, and, in the case of the discharge channels, for example, suctioning out gases, e.g., air, from the volume and thus generating a partial vacuum. The supply channels and/or discharge channels are thus a structural embodiment of the corresponding method features.

A device according to the invention can additionally be implemented such that the second tool device has an upper tool, which is provided with extensions, which, after the mat composite is laid in, submerge it into the mixture in the lower tool of the second tool device. Such extensions are advantageous in particular if the mat composite would float on the mixture because of its porosity and the density accompanying it and the density difference from the mixture. Such extensions are thus used for forced submersion against such floating. In this way, the materials of a mat composite which are not suitable for submersion because of their density difference from the mixture can also be submerged. A device according to the invention which is refined in this way thus expands the field of use of a method according to the invention to such materials.

A device according to the invention can advantageously be implemented such that the second tool device is free of poisons with respect to the cross-linking process of the liquid, cross-linking silicone. As already explained in detail above, it is advantageous if the proportion of poisons, e.g., sulfur or heavy metals in the mixture and the components which touch the mat composite, is as low as possible, in particular essentially zero. It is to be ensured that, for example, alloys of steels which are used for the tool device also do not have any soluble poisons, e.g., soluble heavy-metal components. On the other hand, the danger would exist that the cross-linking of the silicone will only form to an inadequate extent and therefore the stability of the fiber composite material can only be set to an inadequate extent.

Furthermore, it can be advantageous in a device according to the invention if the first tool device and the second tool device are identical and therefore both the bonding of the mats and also the submersion of the mats in the mixture can be performed therein. The identity of the two tool devices with one another simplifies the device in that the transport between the two method steps is dispensed with and, in addition, only a single tool device must be produced. In this way, time is saved during the method and costs are saved during the production of the tool device.

A further object of the present invention is a fiber composite workpiece having at least one porous mat composite made of at least two mats, which are situated one over another and are bonded to one another, made of fibers, which at least sectionally has a matrix made of cross-linked silicone. Such a fiber composite is advantageously produced by a method according to the invention and thus has the same advantages as were already explained for the method according to the invention. A fiber composite workpiece is thus provided, which has a sufficient mechanical stability, which is generated by the mat composite, on the one hand, and has a certain flexibility through the silicone matrix, on the other hand. In this way, the fiber composite workpiece according to the invention can open up new fields of use for fiber composite workpieces, in which the known, hard fiber composite materials were not flexible enough and the known flexible fabrics were not mechanically stable enough. A combination of flexibility and mechanical stability has been able to be provided in a surprising way for the first time by the use of the material silicone, which actually acts as a separating agent, as a matrix for the fiber composite workpiece, which offers a plurality of new possible uses with very light construction.

One of these possible uses is a further object of the present invention. This is a bellows, having flexible wall sections, which delimit a bellows volume, and which at least partially have one or more fiber composite workpieces according to the invention. Such a bellows can be used for rescue workers, for example, who can save transport weight using a bellows, which is very light and nonetheless mechanically stable through the fiber composite workpiece according to the invention, and can nonetheless use the bellows for demanding requirements, such as raising loads, for example, cars after an accident. In a further meaning, the bellows can also be employed as an inflated air chamber, which is used as a floating body. In addition to securing floating objects against undesired sinking, boats can also be at least partially manufactured from such a material. The increased mechanical stability through the fiber composite workpiece according to the invention, in particular in the case of mechanical stresses, as arise due to waves or rocks underwater, on the boats or the air chambers, has a positive effect on the durability of the respective air chamber.

A further possible use for fiber composite workpieces according to the invention is the use in a motor vehicle having a vehicle body which has at least one crash section, which comes into contact with an accident object in case of an accident. A crash section can be an engine hood, a bumper, or also a stabilizing vehicle body frame part, for example. This crash section can have at least one bellows according to the invention, which is designed such that it is supported between the crash section and a further section of the vehicle body upon inflation or in the inflated state. In other words, the bellows mechanically supports the crash section in the form of a vehicle body air bag. The support can be passive and can support controlled deformation of the crash section, or can also be active, in that the respective crash section is brought into a crash position which is different from the normal position by the inflation of the bellows, i.e., by the triggering of the airbag. For example, it is conceivable that an engine hood is raised in an accident situation by bellows according to the invention placed underneath it. In the event of a collision of a pedestrian or a bicyclist, the raising changes the angle of incidence thereof on the engine hood and reduces the danger of injury, or the degree of severity of the injuries. For better energy absorption, the bellows is designed such that it can release air in a controlled way after the inflation. The bellows can already be inflated during the production of the motor vehicle and offer a consistent mechanical support. However, it is also conceivable that the bellows has a fluid-communicating connection with an inflation device, for example, a gas generator, via an opening.

Alternatively or additionally, in a motor vehicle having a vehicle body which has at least one crash section, which comes into contact with an accident object in case of an accident, the crash section can have at least one bellows according to the invention as per the present invention, which is designed such that it is supported between the crash section and the accident object upon inflation or in the inflated state. In the example of positioning in the area of a crash section of the engine hood, this means that the bellows can be inflated in the form of an external airbag on the engine hood and damps the collision of an accident object, i.e., for example, a pedestrian or a bicyclist. Of course, combinations of vehicle body air bags and external airbags in any arbitrary way are also technically conceivable.

A motor vehicle having a vehicle body which has at least one crash section which comes into contact with an accident object in case of an accident is also an object of the present invention and a further possibility for the use of a fiber composite workpiece according to the invention, the crash section being at least sectionally covered using a fiber composite workpiece according to the invention. Such a cover is advantageous in particular upon the use of known, hard fiber composite materials as the crash section, since they splinter in case of crash. The resulting burrs or splinters represent a high risk of injury during the accident, and also afterwards. By covering such crash sections using a fiber composite workpiece according to the invention, the burrs or the splinters occur under the cover. The cover thus prevents direct contact between the burrs or the splinters and a person. In this way, the light construction concept in the vehicle body of a vehicle can be pursued still further, since also classical fiber composite materials having a light, flexible cover made of a fiber composite workpiece according to the invention can also be used in vehicle construction.

BRIEF DESCRIPTION OF THE DRAWINGS

The invention will be described in greater detail on the basis of the appended figures of the drawing. The terms "left", "right", "above", and "below" which are used relate to the figures of the drawing having an orientation with normally readable reference signs. In the figures:

FIG. 3a shows a symmetrical view of the step of positioning the mats;

FIG. 3b shows the positioned mats before the step of bonding the mats;

FIG. 4 shows the step of positioning the mats while employing lamellar stiffening mats;

FIG. 5 shows the step of positioning the mats while employing a flat stiffening mat;

DETAILED DESCRIPTION

Figure 1:
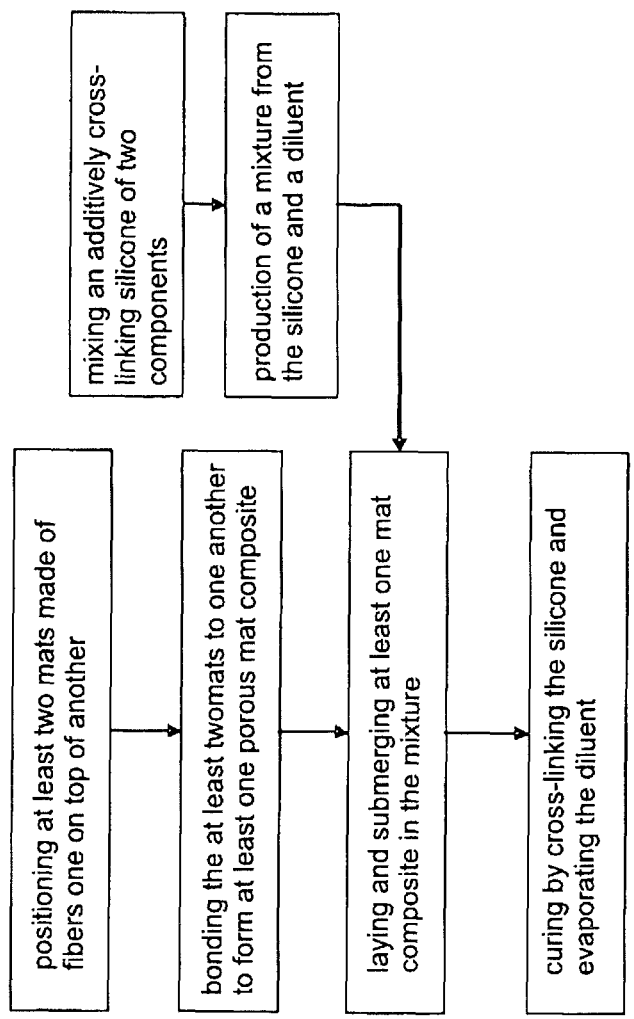
FIG. 1 shows the flowchart of a first embodiment of the method according to the invention.

FIG. 1 shows a first embodiment of the method according to the invention in the form of a flowchart. It may be seen in particular that the step of mixing an additively cross-linking silicone made of two components and the subsequent production of a mixture 40 from the silicone and a diluent can be performed successively and in parallel to the remaining method steps. This parallel embodiment of the method steps allows the method to be accelerated still further. The positioning of at least two mats made of fibers 23 one over another is followed by the bonding of the mats 20 to form a mat composite 30. Subsequently, the mat composite 30 is laid in the mixture 40 and submerged. In this state, the curing is performed by cross-linking the silicone and evaporating the diluent. In this way, it is possible that silicone can be used as a matrix in a mat composite 30 for producing a fiber composite workpiece.

Figure 2:
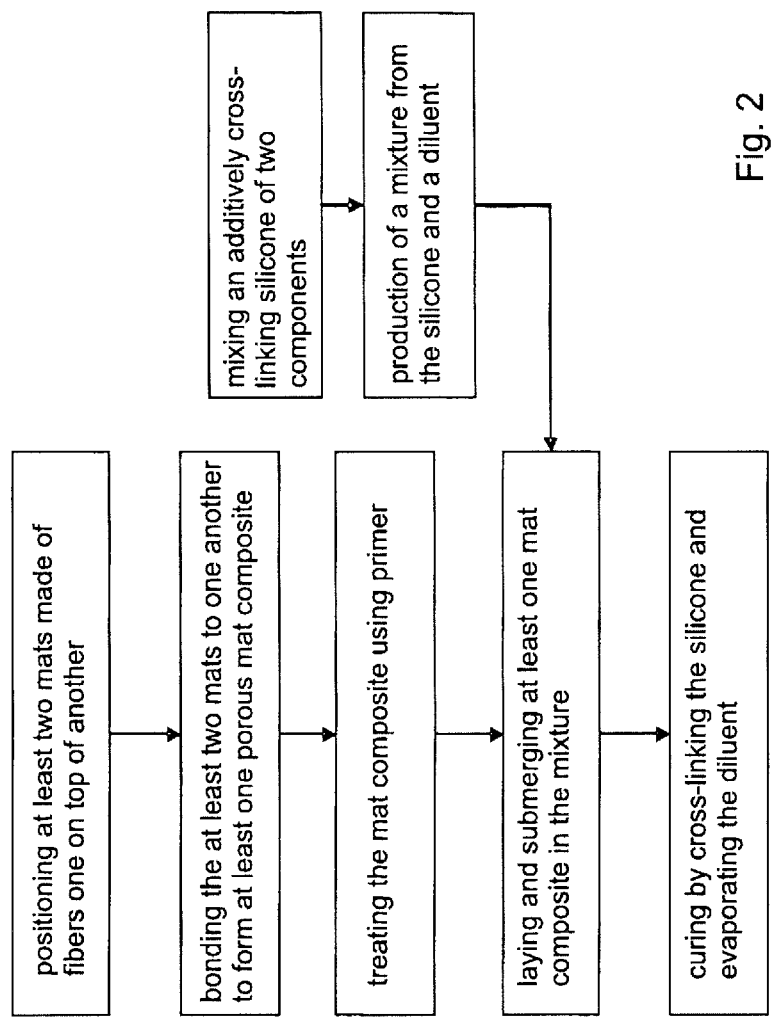
FIG. 2 shows the flowchart according to FIG. 1 having a variation.

FIG. 2 shows a variant of the embodiment of the method according to the invention according to FIG. 1. The embodiment according to FIG. 2 differs from that according to FIG. 1 in that the mat composite 30 is pretreated using a primer before it is laid and submerged in the mixture 40. This primer is an adhesion promoter, which improves the adhesion of the mixture 40, in particular the cross-linking silicone contained therein, to the fibers 22 of the mats 20 of the mat composite 30. This adhesion ideally occurs through the formation of carbon bridges, and also through support by the formation of hydrogen bridge bonds.

The performance of an embodiment of the first step of a method according to the invention is structurally shown in FIGS. 3a and 3b. It may be seen in FIG. 3a how three mats 20 made of fibers 22 are laid one on top of another. The procedure of laying one on top of another, i.e., the positioning, is shown by the two curved arrows. FIG. 3a shows that the individual fibers 22 of the respective mat within a mat 20 are situated essentially parallel to one another, i.e., run along a single direction. However, this orientation of the fibers 22 differs from mat 20 to mat 20. Mats having different fiber orientations are thus laid one on top of another here, so that a mat braid or a mat lattice is produced. By this method it is possible to produce a workpiece or product component the material of which has fibers running in the direction of the main stress lines of the final product for which the workpiece or product part is intended to be integrated. This mat lattice is already shown as a mat composite 30 in FIG. 3b, which is situated in a first tool device 50.

This first tool device 50 consists of two plates, which can be moved toward one another, so that the mat composite 30 can be compressed between them and advantageously can have temperature applied thereto. Through the provision of glued joints, which can be provided by the fibers 22 themselves or by thermoplastic binders as exemplary glued bonds, bonding of the individual fibers 22 and/or the mats 20 among one another is performed. As a result, a mat composite 30 arises, as is shown after the plates of the first tool device 50 are moved apart in FIG. 3b.

FIGS. 4 and 5 show two embodiments of the positioning of mats 20, which are performed employing stiffening mats 24. Similar positioning is performed in FIG. 4 as was explained for FIG. 3a. However, a plurality of stiffening mats 24 is laid here between the two mats 20, each having identical orientation of the fibers 22, i.e. generally identical orientation from a theoretical point of view. The orientation of the stiffening mats 24 is essentially perpendicular to the orientation of the fibers 22 in the mats 20 situated above or beneath them. In this way, a lamellar structure of the stiffening mats 24 fundamentally results, which has stiffening in the main extension thereof as the goal. The flexibility against the main extension thereof is essentially uninfluenced. In this way, employing such lamellar stiffening mats 24, targeted influence of the flexibility and/or targeted improvement of the mechanical stability can be achieved in individual orientations of the fiber composite workpiece.

In FIG. 5, in contrast to FIG. 4, a stiffening mat 24 is shown which has an essentially planar extension in two spatial directions. The stiffening mat 24 thus lies essentially over the entire area between the two mats 20 and the fibers 22 provided therein. To ensure that during the infiltration procedure of the mixture 40, it also reaches all cavities between the fibers 22 in the case of a plurality of stiffening mats 24 and thus ideal cross-linking of the silicone can be achieved, openings 25 are provided in the stiffening mat 24. The infiltration channels in the mat composite 30 on both sides of the stiffening mat 24 are connected to one another through these openings 25, so that a stiffening mat 24 also does not result in individual areas being cut off from the infiltration by the mixture 40. Rather, in spite of the use of an essentially planar stiffening mat 24, the entire mat composite remains open-pored, i.e., able to be essentially completely infiltrated by the mixture 40 made of the silicone and the diluent.

Figure 6:
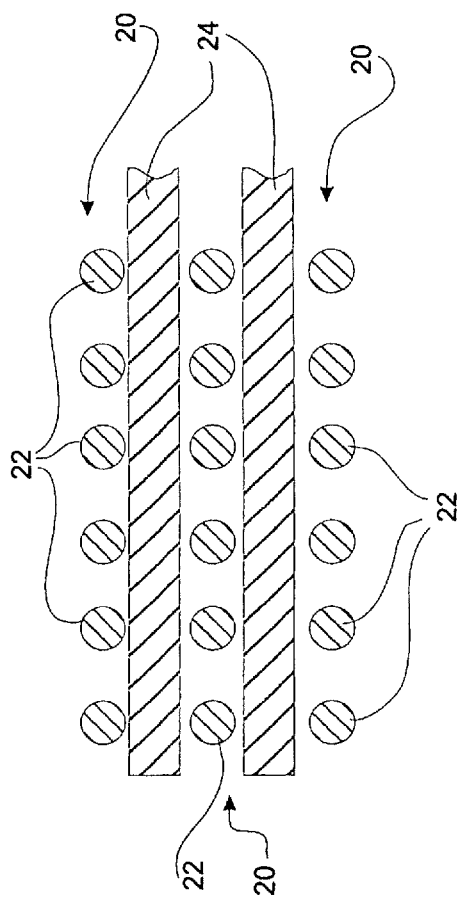
FIG. 6 shows the cross-section through the positioned mats according to FIGS. 4 and 5.

FIG. 6 shows the embodiment according to FIGS. 4 and 5 in cross-section. It may be seen therein that the fibers 22 of the three mats 20 shown here have essentially the same orientation. Stiffening mats 24 are situated between these mats 20, which may be implemented as shown in FIG. 4 and in FIG. 5. These run essentially transversely to the orientation of the fibers 22 of the mats 20 and are situated one on top of another here, in relation to the mats 20. A sandwich construction thus results, which alternately provides one mat 20 and one stiffening mat 24. In this way, arbitrarily thick fiber composite materials can be produced, simply by increasing the number of mats 20 or by increasing the number of stiffening mats 24. Different types of iteration can also be conceivable, i.e., multiple mats 20 followed by one stiffening mat 24 or vice versa.

Figure 7:
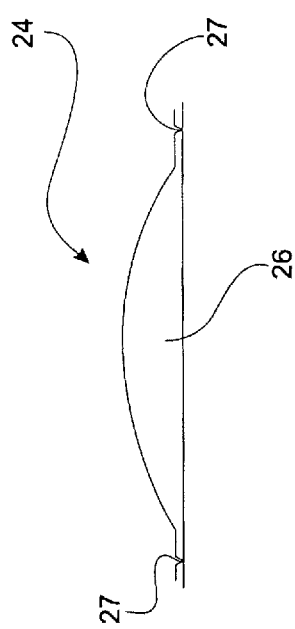
FIG. 7 shows a variant of a stiffening mat having a cavity in cross-section as a detail.

A special embodiment of a stiffening mat 24 is shown in FIG. 7. This stiffening mat 24 is two-layered and has a cavity 26 or a cavity channel 26 between these two layers. The two layers are bonded to one another at bonding seams 27. It is not shown in FIG. 7 that the cavity 26 is sealed or closed during the laying and the performance of the method according to the invention. In this way, no mixture 40 made of silicone and volatile diluent can penetrate into this cavity 26. After the curing of the silicone, the seal or the closure of the cavity 26 can be opened and it is thus open to flooding with fluid. If compressed air is applied to this cavity 26, for example, the two layers of the stiffening mat 24 can be spaced apart from one another, i.e., the effect of inflation arises as in an air mattress, whereby areas in which such a stiffening mat 24 is provided can be both stiffened and also brought into a predefined shape.

Figure 8:
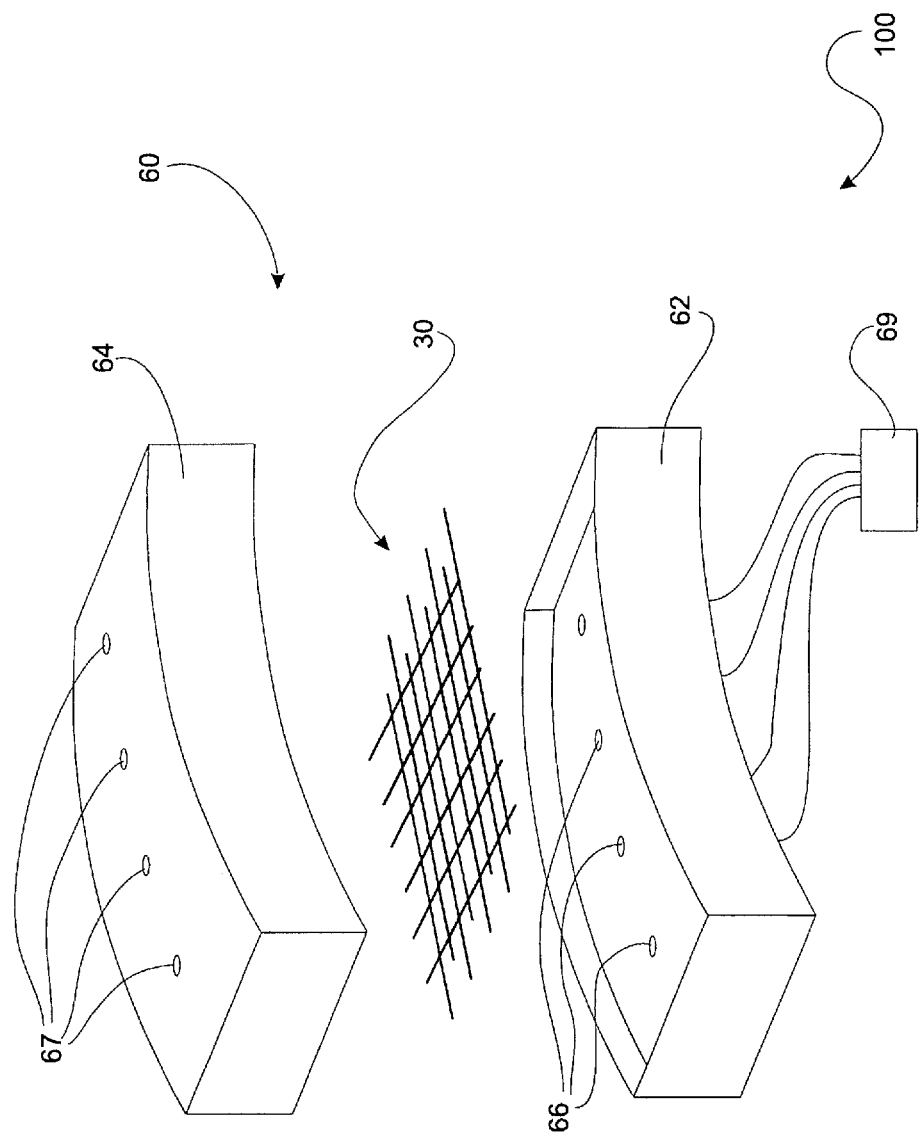
FIG. 8 shows an embodiment of a second tool device.

FIG. 8 shows an embodiment of a second tool device 60 according to the invention. It performs the steps after the bonding to form a mat composite 30. The situation shown in FIG. 8 is still before the mat composite 30 is laid in the mixture 40. The mixture 40 has not yet been poured into a lower tool 62 of the second tool device 60. The step of this laying and the performance of these method steps are to be explained hereafter on the basis of FIG. 8.

The mat composite 30 is laid in the lower tool 62 of the second tool device 60. The upper tool 64 of the second tool device 60 is subsequently moved downward and more or less closes the second tool device 60. The mat composite 30 is enclosed between the lower tool 62 and the upper tool 64 in this way. A cavity is formed between them, i.e., an internal volume which is larger than the extension of the mat composite 30 in all three spatial directions. Subsequently, mixture 40 is supplied to this cavity via supply channels 66 in the lower tool. This supply is performed using a supply device 69, which is advantageously simultaneously capable of producing the mixture 40. Such a supply device 69 can have a pump, for example, which introduces the mixture via fluid channels into the supply channel 66 and, via this, into the cavity of the second tool device 60. The liquid level of the mixture 40 rises above the geometric extension of the mat composite 30, so that the mat composite 30 is thus submerged below the mixture 40. The air displaced by the inflow of the mixture 40 is suctioned off via discharge channels and 67 and discharge lines (not shown) or a discharge device (not shown). Such a discharge device can be a compressor, for example, which suctions off the air and thus produces a partial vacuum in the cavity of the second tool device 60. However, it is also possible that the discharge channels 67 are simply openings in the upper tool 64, so that air displaced by the inflowing mixture 40 can escape upward.

Figure 9:
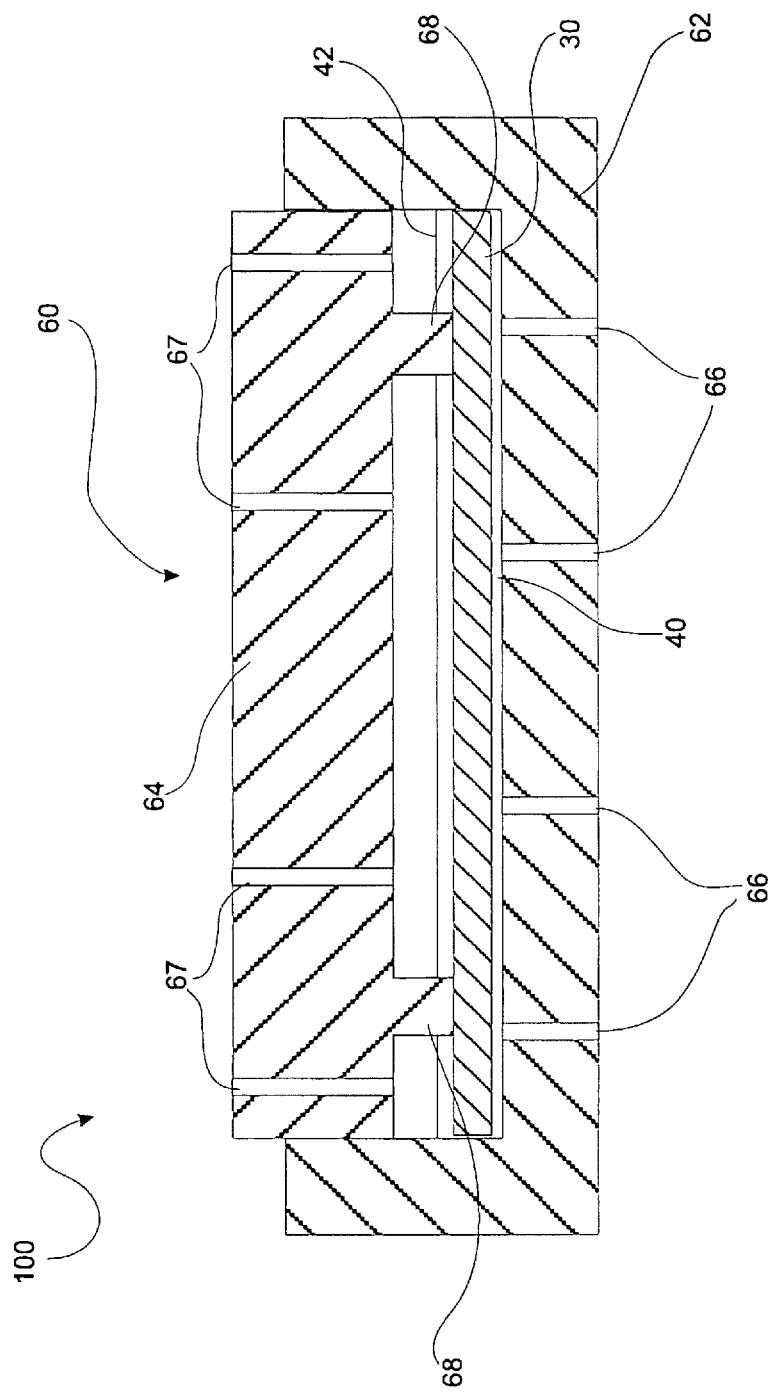
FIG. 9 shows a further variant of a tool device in closed form.

A variant of the embodiment according to FIG. 8 is shown in FIG. 9. The second tool device 60 is shown in cross-section therein, the upper tool 64 being retracted into the lower tool 62. The mixture 40 can also be seen here, which has a liquid level 42. In order to ensure that the mat composite 30 is submerged completely below the liquid level 42 of the mixture 40, the upper tool 64 of the second tool device 60 has extensions 68 in this embodiment. These extensions 68, which are shown here in the form of essentially cuboid lugs, press the mat composite 30 below the level 42 of the mixture 40. However, the active pressure is only required when the mixture 40 is introduced into the cavity of the second tool device through the supply channels 66. The mat composite 30 would float due to this filling without the extensions 68 and the submersion in the mixture 40 would no longer be ensured. Through the provision of the extensions 68, the mat composite 30 is held in the position shown in FIG. 9 and the submersion in the mixture 40 is ensured in this way. Through the inflow of the mixture 40 through the supply channels 66, the volume present for air in the cavity is reduced in the second tool device 60. This air can escape via discharge channels 67 in the upper tool 64, so that it is ensured that excess pressure does not arise in the cavity, which would counteract the infiltration of the mixture 40 into the mat composite 30.

Figure 10:
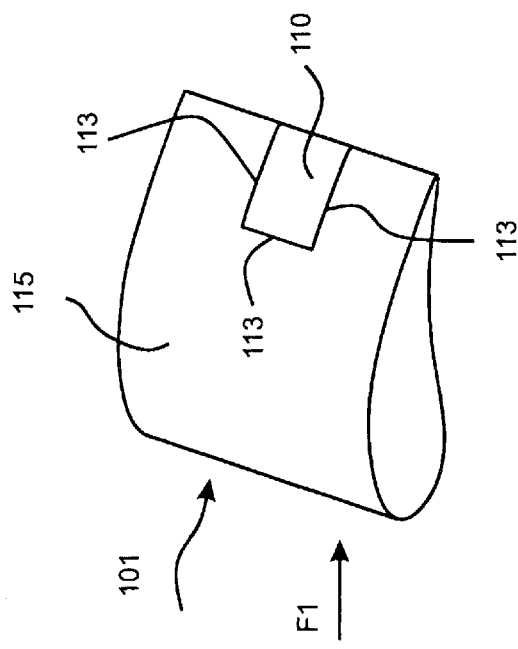
FIG. 10 shows a fluid dynamic body and in particular an aerodynamic body according to the invention.

FIG. 10 shows a fluiddynamic body and in particular an aerodynamic body 101 according to the invention which can in particular be a wing or a control flap comprising an adjustment device is provided. The fluiddynamic body can in particular be a rudder or a side wall of the ship body. The adjustment device is a deformable structural part 110. In the embodiment shown in FIG. 10 is an aerodynamic body 101 comprising the deformable structural part 110 is a flexible shell part which is connected to the wing or flap such that a deformation of the deformable structural part effects or influences the aerodynamic flow on the surface of the aerodynamic body originated by a free flow F1 on the same in operation. The deformable structural part 110 is made according to the invention and in particular made at least of one porous mat composite 30 made of at least two mats 20, which are situated one on top of another and are bonded to one another, made of fibers 22, which at least sectionally has a matrix made of cross-linked silicone. The deformable structural part is connected to the aerodynamic body such that portions or edges 113 of the same are connected to the aerodynamic body in a manner that a surface portion of the aerodynamic body 101 is part of the flow surface of the aerodynamic body 101 so that the a surface portion 115 of the aerodynamic body 101 surrounding the deformable structural part 110 together with at least a portion of the surface 115 of the deformable part form a unitary flow surface of the aerodynamic body. An actuation device (not shown) is coupled to the deformable body 110 such that it can actuate the same in a predetermined manner and thereby forms the same in a predetermined manner. Depending on the actuation movement of the actuation device, the deformable body forms different deformable states, by which consequently also the flow surface of the aerodynamic body 101 is modified or deformed. A control device (not shown) which is coupled to the actuator generates, on the basis of a control function, command signals in order to actuate the actuator. The wing 101 or flap 101 comprising the deformable body 110 has the function to steer the aircraft, i.e. influence or maintain the flight attitude of the aircraft, and/or to adjust the aerodynamic behavior of the same and especially the local lift coefficient of the same and/or to influence vortices which are caused by the wing or flap depending on the flow over the surface of the same.

Figure 11:
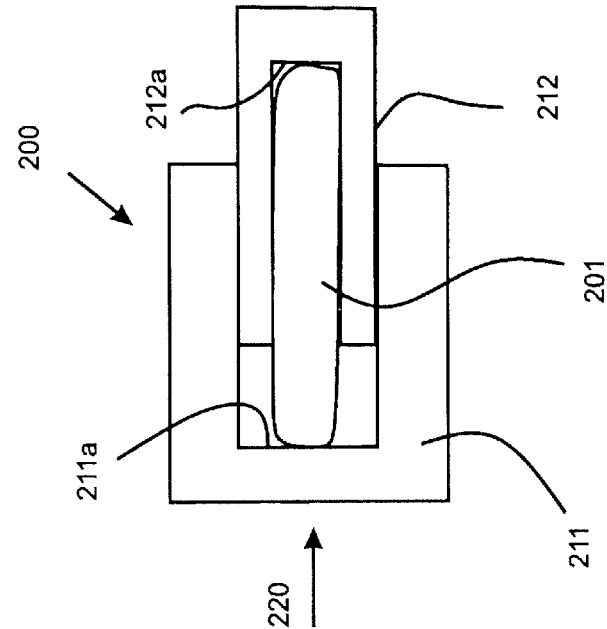
FIG. 11 shows a further embodiment of the invention.

FIG. 11 shows a further embodiment of the invention. A shock absorber 200 comprises a bellows or a bladder 201 formation which is at least partially made according to the invention and in particular made at least of one porous mat composite 30 made of at least two mats 20, which are situated one on top of another and are bonded to one another, made of fibers 22, which at least sectionally has a matrix made of cross-linked silicone. The shock absorber 201 can comprise a first body 211 and a second body 212 which are arranged in a manner that they can be moved particularly translationally relative to each other. The bellows or a bladder 201 which advantageously is filled with gas is designed such and situated such within the shock absorber 201 that it lies against an inner wall 211a of the first body 211 and an inner wall 212a of the second body 212 at least in a state of the shock absorber 200 in which the first body 211 and the second body 212 is pushed together in particular by an external impact on the first body 211 or second body 212. As example, in FIG. 11 an arrow 220 is shown as an example for the direction of an impact. However, the direction of an impact in particular actin on the second body 212 can also be in an opposite direction.

The shock absorber can in particular be integrated in the front end section of an automobile on order to absorb kinetic energy in the case of a crash or an impact an in order to fulfill a safety function of an automobile thereby.

In another embodiment of the invention, a front end of an automobile comprises the bellows or a bladder 201 filled with gas which is integrated within a space of the body work of the front end. The bellows or a bladder 201 is at least partially made according to the invention and in particular made at least of one porous mat composite 30 made of at least two mats 20, which are situated one on top of another and are bonded to one another, made of fibers 22, which at least sectionally has a matrix made of cross-linked silicone. When there is an impact onto the front end and the front end is deformed or pushed together, the bellows or a bladder 201 filled with gas absorbs impact energy so that a safety function of an automobile can be fulfilled thereby in the case of a crash or an impact.

LIST OF REFERENCE NUMERALS 20 mat
22 fiber
24 stiffening mat
25 openings in stiffening mat
26 cavity
27 bonding seam
30 mat composite
40 mixture
42 liquid level of the mixture
50 first tool device
60 second tool device
62 lower tool
64 upper tool
66 supply channels
67 discharge channels
68 extension
69 supply device
100 device

The invention claimed is:

1. A method for producing a flexible fiber composite workpiece, comprising:
    positioning at least two mats made of fibers one on top of another;
    bonding the at least two mats to one another to form at least one porous mat composite;
    producing a mixture of liquid, cross-linking silicone with at least one volatile diluent, which has a lower viscosity than the silicone alone;
    laying and submerging at least one mat composite in the mixture; and
    curing by cross-linking the silicone and evaporating the diluent, wherein the silicone imparts flexibility to the fiber composite workpiece.

2. The method according to claim 1, wherein the bonding of the mats made of fibers is performed using gluing.

3. The method according to claim 1, wherein, during the positioning of the mats made of fibers, at least one stiffening mat made of already-cured fiber composite material is laid between the individual mats.

4. The method according to claim 3, wherein multiple stiffening mats are inserted adjacent to one another and/or one on top of another along at least one common orientation.

5. The method according to claim 3, wherein the stiffening mats have reversibly closed cavities and cavity channels, which are inserted such that these cavities can be opened after ending the immersion procedure.

6. The method according to claim 1, wherein a partial vacuum is applied to the mat composite during the evaporation of the diluent and/or the submersion of the mat composite.

7. The method according to claim 1, wherein a petroleum is used as the volatile diluent.

8. The method according to claim 1, wherein, in a mixture, the mixing ratio between the liquid, cross-linking silicone and the diluent is 2:1.

9. The method according to claim 1, wherein, before the mat composite is laid in the mixture, the mat composite is pretreated using a primer to improve the adhesion of the silicone to the fibers of the mat composite.

10. The method according to claim 9, wherein the primer is an adhesion promoter between the liquid, cross-linking silicone and the fibers in the mats of the mat composite.

* * * * *